(12) United States Patent
Kuznia et al.

(10) Patent No.: US 10,712,508 B2
(45) Date of Patent: *Jul. 14, 2020

(54) FIBER OPTIC END-FACE TRANSPARENT PROTECTOR SYSTEM AND METHOD

(71) Applicant: Ultra Communications, Inc., Vista, CA (US)

(72) Inventors: Charles B. Kuznia, Encinitas, CA (US); Richard J. Pommer, Carlsbad, CA (US); Joseph F. Ahadian, San Marcos, CA (US); Richard T. Hagan, Mission Viejo, CA (US); Man W. Wong, San Diego, CA (US)

(73) Assignee: Ultra Communications, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,184

(22) Filed: Nov. 16, 2018

(65) Prior Publication Data

US 2019/0154926 A1 May 23, 2019

Related U.S. Application Data

(63) Continuation of application No. 15/699,484, filed on Sep. 8, 2017, now Pat. No. 10,162,124, which is a
(Continued)

(51) Int. Cl.
*G02B 6/38* (2006.01)

(52) U.S. Cl.
CPC ........... *G02B 6/3847* (2013.01); *G02B 6/382* (2013.01); *G02B 6/3849* (2013.01); *G02B 6/3882* (2013.01); *G02B 6/3885* (2013.01)

(58) Field of Classification Search
CPC .............................. G02B 6/3849; G02B 6/382
(Continued)

(56) References Cited

U.S. PATENT DOCUMENTS

| 6,177,163 B1 | 1/2001 | Blok et al. |
| 6,474,490 B1 | 11/2002 | Seibel et al. |

(Continued)

FOREIGN PATENT DOCUMENTS

| EP | 2924483 | 9/2015 |
| GB | 2100465 | 12/1981 |
| JP | 55-153912 | 12/1980 |

OTHER PUBLICATIONS

Tavlykaev, Robert Fuatovich, Office Action received from the USPTO dated Apr. 3, 2018 for U.S. Appl. No. 15/699,484, 15 pgs.
(Continued)

*Primary Examiner* — Robert Tavlykaev
(74) *Attorney, Agent, or Firm* — Jaquez Land Greenhaus LLP; Alessandro Steinfl, Esq.

(57) ABSTRACT

A protective assembly method using a transparent layer within the fiber interconnect system aids in optical coupling by preventing an air gap from forming between the fiber cores within a connector. A thin transparent film (or with adhesive) is placed over the fiber end-faces at the connector interface, the film having characteristics which allows it to conform to the fiber end and minimize coupling loss between fibers. The film is sized to fit connectors faces and can be temporary, being replaced with each installation. A coating can also applied to the connector surface, providing a similar effect, as well as structurally enhancing the connector surfaces.

19 Claims, 16 Drawing Sheets

300

Related U.S. Application Data continuation of application No. 14/752,986, filed on Jun. 28, 2015, now Pat. No. 9,784,924.

(60) Provisional application No. 62/019,405, filed on Jun. 30, 2014.

(58) Field of Classification Search
USPC .......................................... 385/60, 134, 147
See application file for complete search history.

(56) References Cited

U.S. PATENT DOCUMENTS

| | | |
|---|---|---|
| 6,634,732 B2 | 10/2003 | Farr et al. |
| 7,219,979 B2 | 5/2007 | Spivey et al. |
| 7,540,584 B2 | 6/2009 | Bertelsen et al. |
| 8,083,321 B2 | 12/2011 | Krawczyk et al. |
| 8,334,036 B2 | 12/2012 | Buchbinder et al. |
| 10,162,124 B2 | 12/2018 | Kuznia et al. |
| 10,551,572 B2 | 2/2020 | Kuznia et al. |
| 2003/0217806 A1 | 11/2003 | Tait et al. |
| 2005/0084641 A1 | 4/2005 | Downs et al. |
| 2006/0147668 A1 | 7/2006 | Hirose et al. |
| 2008/0104917 A1 | 5/2008 | Whelan et al. |
| 2008/0173404 A1 | 7/2008 | Guillory |
| 2009/0078671 A1 | 3/2009 | Triquet et al. |
| 2010/0233410 A1 | 9/2010 | Abrams |
| 2013/0287987 A1 | 10/2013 | Koch |
| 2015/0266262 A1 | 9/2015 | Hill et al. |
| 2016/0187591 A1 | 6/2016 | Fortusini et al. |
| 2018/0284358 A1 | 10/2018 | Lu et al. |
| 2019/0353851 A1 | 11/2019 | Kuznia et al. |

OTHER PUBLICATIONS

Tavlykaev, Robert Fuatovich, Notice of Allowance received from the USPTO dated Aug. 16, 2018 for U.S. Appl. No. 15/699,484, 15 pgs.

Kuznia, et al., Response filed in the USPTO dated Jul. 13, 2018 for U.S. Appl. No. 15/699,484, 14 pgs.

Tavlykaev, Robert Fuatovich, Notice of Allowance received from the USPTO dated Nov. 14, 2019 for U.S. Appl. No. 16/200,139, 13 pgs.

PRIOR ART

FIBER OPTIC END-FACE TRANSPARENT PROTECTOR SYSTEM AND METHOD

CROSS-REFERENCE TO RELATED APPLICATION(S)—CLAIMS OF PRIORITY

This application is a continuation of and claims the benefit of U.S. patent application Ser. No. 15/699,484 filed Sep. 8, 2017, which claims the benefit of U.S. patent application Ser. No. 14/752,986, filed Jun. 28, 2015, issuing as U.S. Pat. No. 9,784,924 on Oct. 10, 2017, which application Ser. No. 14/752,986 claims the benefit of U.S. Provisional Patent Application No. 62/019,405, filed Jun. 30, 2014, and the contents of all the patent applications and issued patents set forth above are hereby incorporated by reference as if set forth in full.

FEDERALLY-SPONSORED RESEARCH AND DEVELOPMENT

This disclosure was made with Government support under N68335-11-C-0383 awarded by the United States Navy. The government may have certain rights.

FIELD

This present disclosure relates to fiber optic connector interfaces. This disclosure aids in protecting the tip of the fiber, especially the region that guides light, while allowing light coupling between fibers. This invention can be used to protect fiber optic connector end-faces during the manufacturing process of cables and also during the general use of fiber optic cables.

BACKGROUND

Fiber optic cables are often connected together by aligning and pressing the ends of two fibers together. The end of the fibers (the 'end-faces') are typically polished smooth and flat, or at an angle. The optical coupling occurs between the cores of the fibers, which is the central portion of the fiber that guides the optical energy. The types of fiber can be single-mode-fiber (SMF), with a core that is usually 9 microns in diameter, or multi-mode-fiber (MMF), with a core that is much larger, but typically between 50 to 100 microns in diameter. Efficient optical coupling occurs when the cores of the two fibers are aligned and in physical contact. Ideally, nearly 100% of the light is coupled between the two fibers, but in practice, a loss of up to 0.3 dB may be acceptable.

Imperfections in the fiber end-face polished surface or contamination trapped between the cores of the fibers can reduce the efficiency of the optical coupling. These imperfections can also create an increased amount of back-reflected light from the connector interface. Imperfections can arise during the handling and use of the fiber. Imperfections can be in the form of scratches or other mechanical damage to the end-face of the fiber. Contamination can result from liquid sources or oils on the fiber end-face. Contamination can also result from particles trapped within the fiber-to-fiber interface. Particles can originate from the connector itself, for example, from the regions where the mechanical alignment mechanisms engage (such as guide holes), or from external sources, such as dust in the environment outside the connector. A trapped particle can further damage the end-face polish if the particle hardness is similar or greater that the glass in the fiber core. A particle can create scratches on the fiber end-face.

The optical coupling efficiency between the two fiber cores is reduced if the fiber cores are not in physical contact and an air gap is created between the cores. An air gap will create a Fresnel reflection of approximately 4% at each of the two core-to-air interfaces, a double Fresnel reflection. If this light is coherent, the interference of the reflections can create additional coupling loss.

Multi-fiber connectors are designed to bring two arrays of fiber end-faces into alignment and create physical contact between the fiber cores. The manufacturing process typically polishes the fiber connector end-face, polishing multiple fibers simultaneously. The polishing process typically leaves the tips of the fibers slightly protruding from the connector face by 1 to 3 microns. This allows two connectors to mate and have the fiber end-faces make physical contact.

The protrusions of the fiber tips on the connector are not typically perfectly uniform. The polishing process may leave a taper or a curvature across the array. Therefore, there is a provision in the connector to allow the fibers to recess under pressure. A spring can be provided within the connector to create the pressure. As two fiber connectors mate, the fibers that have a greater protrusion will come into contact first. Under pressure, these two fibers will recede into their connector until fibers with less protrusion make physical contact.

A failure in the recess mechanism may make a fiber fail to rebound after it has been recessed. This failure is called 'pistoning'. The fiber tip has been pressed down into the connector, but does not restore to a protruding state after un-mating of the connector. Pistoning can cause failure of a subsequent mating, as the fiber is not protruding enough to create physical contact.

Damage may occur to the fiber end-face during the process of manufacturing the fiber optic cable. There may be steps of handling the cable for testing, inspection or installation of the cable into a higher-level assembly. The manufacturer may ship the cable to a customer that further handles the cable before final installation into a network.

Fiber optics are finding use in applications that operate in harsh environments, such as aircraft, helicopters, unmanned vehicles, ship-board, space-craft and missiles. The fiber optic components must be able to operate and survive in an environment with severe shock, vibration, exposure to liquid contaminates, and over wide temperature ranges (such a −55 C to 125 C). These environmental stresses can cause the fiber end-faces, in physical contact within a connector, to become damaged or contaminated. Damage may occur when a particle trapped in the optical interface is moved along the fiber end-face due to vibration, shock or thermal expansion/contraction. This movement may leave scratches on the polish surface of the fiber end-face. An environment that exposes the connector to liquid contaminate can compromise optical coupling if the liquid enters into an air gap between two fiber cores.

Therefore, there has been a long-standing need for systems and methods for providing more precise fiber end coupling. Details of such systems and methods are provided below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, an exposed optical fiber end protection device is provided for facilitating high optical coupling efficiency between pairs of a plurality of optical fiber ends to be joined via mating of their respective mechanical optical couplers, comprising: first and second planar tapes, each composed of two stacked transparent layers, a first layer of the tapes being an adhesive layer and a second layer of the tapes being a support layer for the adhesive layer and having an index of refraction between approximately 1.1-2.2, and a Rockwell scale E hardness of approximately between 30-150, wherein the tapes are pre-sized to fit over prospective first and second multi-fiber ferrule faces; and pre-formed alignment openings disposed in the tapes, positioned and sized to align the tapes to the prospective multi-fiber ferrule faces and allow passage of prospective ferrule securing mechanisms through the alignment openings; wherein the first tape is adapted to be applied (adhesive-side) to the first prospective multi-fiber ferrule face, and the second tape is adapted to be applied (adhesive-side) to the second prospective multi-fiber face, the tapes flexibly conforming around exposed optical finer ends in the ferrule faces to prevent contamination of the exposed optical fiber ends and reduce Fresnel reflections.

In another aspect of the disclosed embodiments, a method of facilitating high optical coupling efficiency is provided for a mechanical optical coupler with another mechanical optical coupler, comprising: forming a planar tape composed of two stacked transparent layers, a first layer of the tape being an adhesive layer and a second layer of the tape being a support layer for the adhesive layer and having an index of refraction between approximately 1.1-2.2, and a Rockwell scale E hardness of approximately between 30-150, wherein the tape is pre-sized to fit over a multi-fiber ferrule face; forming pre-formed alignment openings in the tape, positioned and sized to align the tape to the multi-fiber ferrule face and allow passage of ferrule securing mechanisms through the alignment openings; forming a perforate pattern on perimeter of the tape; housing the tape in dispensing cartridge, wherein the cartridge has one or more exposed faces with the tape therein; aligning the multi-fiber ferrule face to the exposed face of the cartridge to adhere the tape's adhesive layer to the ferrule's face; and retracting the multi-fiber ferrule with the adhered tape from the cartridge.

BRIEF DESCRIPTION OF THE DRAWINGS

FIG. 10 shows two fiber connectors mated with an exemplary fiber protector in-between.
FIG. 11 shows two fiber connectors mated with two an exemplary fiber protectors in-between.

DETAILED DESCRIPTION

Figure 1:
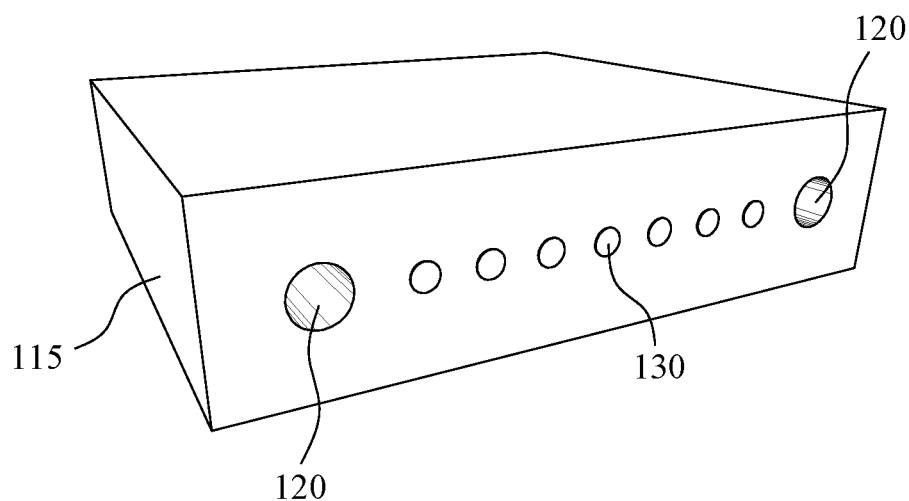
FIG. 1 shows a prior art multi-fiber connector.

The exemplary fiber optic interface system, and the assembly method of a transparent layer within the interconnect system, are described in this application. This system creates a fiber optic interface system that places a thin transparent film over the fiber end-faces at the connector interface. This system can use a temporary film, designed to be removed or replaced if necessary, or a permanent layer, designed to remain on the fiber end-face through the life of the fiber cable. The film is thin and transparent creating minimal additional coupling loss between to fibers. The additional coupling loss can be small enough to allow fiber optic cable testing and general use with the layer in place.

The system aids in optical coupling by preventing an air gap from forming between the fiber cores within a connector. The system may also prevent damage to the fiber end-faces during cable manufacturing and general use. The system may prevent foreign objects or liquids from becoming trapped between the fiber cores within a connector.

The temporary film is applied in a manner that covers the end-faces of fibers at a connector interface. The film supplies compliance to allow the fiber end-faces to embed themselves into the film, making physical contact between the fiber core and the film. The film can be made up of multiple layers, such as an adhesive layer and a structural layer. The adhesive layer can allow the film to be applied and removed from the fiber end-faces. Ideally, the adhesive layer leaves no residues on the fiber end-faces after removal.

The permanent film can be applied one time and remains on the fiber cable throughout the lifetime use. The permanent film may include additional functionality of coating the fiber connector interface and preventing pieces of the fiber connector from breaking off during mating of the connector.

A temporary film may be applied using a cartridge containing multiple films. The cartridge can have method of aligning the fiber connector end-face to the film during application. The cartridge can provide mechanical support of the film during application. The cartridge may operate in a tool that provides a means to apply the film onto the fiber end-face. The tool may have a feature to apply a film to a connector, and then advance the cartridge to another region on the cartridge for application on another connector.

The permanent film may be applied with a coating process. The coating process may apply the film to the region of the fiber end-faces, the entire end-face or a region that includes some or all of the entire connector.

The exemplary system(s) and method(s) has application in the general field of fiber optic cables. It can be used during the manufacturing process to protect the fiber end-face, without sacrificing the ability to measure the optical coupling properties of the cable. It can be used to protect fiber cables that are found in higher-level assemblies (such as modules, or box-level solutions) during the manufacturing and test process of the assembly. The exemplary system(s) and method(s) can aid the connector performance in harsh environment applications; and can relax the polishing specifications normally required to create physical contact between fiber cores.

FIG. 1 is an illustration of a prior art multi-fiber connector 110 that is made up of a ferrule 115 that holds fibers 130 aligned to each other and to an alignment mechanism 120. There are many types of alignment mechanisms 120, including, but not exclusively, guide pin and guide holes, features that are processed monolithically into the ferrule 115, or features that align the outer body of the ferrule 115, such as a sleeve. The alignment mechanism 120 provides a means to align two of the multi-fiber connectors 110 together during the mating of two sets of the fibers 130, so that light couples between the fibers. The fibers 130 can be polished or cleaved so that the ends of the fibers are roughly flat or at an angle. The fibers 130 and face of the ferrule 115 can be polished together in a single processing step. The fibers 130 can protrude slightly from the ferrule 115 to allow for physical contact with another set of fibers (not shown) in a mating ferrule. A typical fiber protrusion is 1 to 3 microns. The fibers 130 can be mounted into the ferrule 110 using an adhesive that provides compliance to allow the fibers 130 to recess toward the ferrule 110 when pressure is applied to the ends of the fibers 130 during connector mating. It should be apparent that the exposed fiber 103 ends, renders them susceptible to contamination (from debris, dust, etc.) or even damage. To date, there is no known protection scheme other than the installer perhaps placing a rag over the multi-fiber connector 110 whilst preparing the mating connector. The following Figures show various improvements to the prior art.

Figure 2:
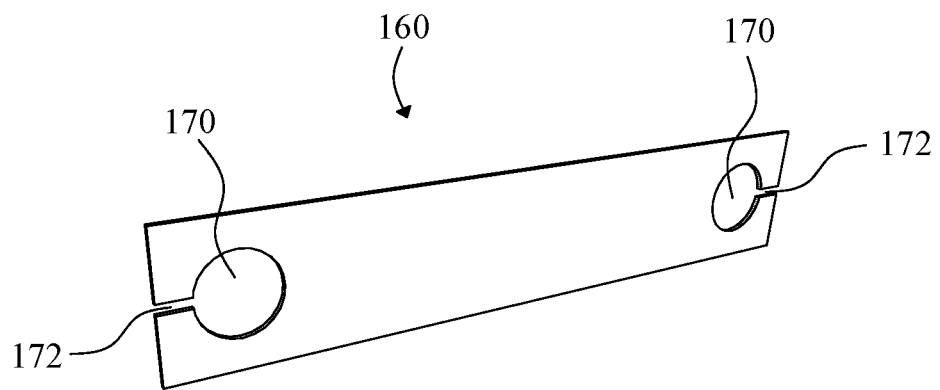
FIG. 2 shows an exemplary fiber protector.

FIG. 2 shows one embodiment of an exemplary fiber protector 1sade with a transparent film 160. The film can have clearance 170 regions to prevent mechanical interference with alignment mechanisms 120, if present, or other features within the connector. The clearance 170 features can aid in alignment of the film to the ferrule 110 during the application process. The clearance 170 regions can have a clearance-to-edge slot 172 or other feature (micro slots around clearance 170, etc.) that eases the installation or removal of the fiber protector 150. The film 160 is thin and in some embodiments is approximately less than 50 microns. The film should be soft enough to conform around the fiber end-face. In commercial embodiments, a Rockwell scale E hardness of the film in the range of approximately 30 and 150 was found to be effective. Of course, other values may be found effective, depending on the implementation. A non-exhaustive list of film materials that may be suitable are polyimide, polyethylene, polyurethane, and silicone. The fiber protector 150 can be manufactured by cutting or stamping a pattern into a film. A laser could be used for cutting the film, as well as other suitable manufacturing methods. The fiber protector 150 can be applied to a fiber connector 202 having 1 or more fibers.

Figure 3:
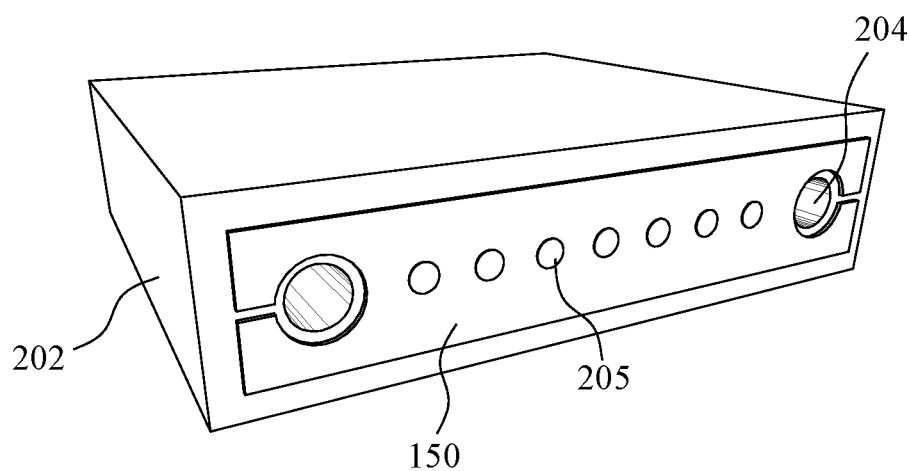
FIG. 3 shows an exemplary fiber protector mounted on a multi-fiber connector.

FIG. 3 shows an exemplary fiber protector 150 mounted on a prior art multi-fiber connector 202, creating a protected connector 200. The fiber protector 150 covers the fiber(s) to create protected fiber(s) 205. The fiber protector 150 can have a clearance around the alignment mechanism 204 on the fiber connector 202.

Figure 4:
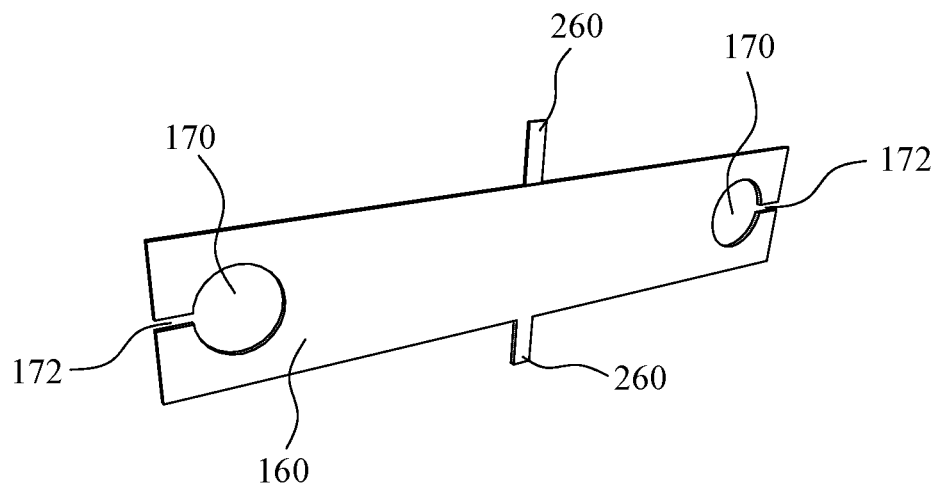
FIG. 4 shows an exemplary fiber protector with tabs.

FIG. 4 shows an exemplary fiber protector 250 with extending tabs. In this embodiment, tabs 260 are provided onto the fiber protector 250 to ease in the removal of the film 160. The tabs 260 can be placed in an area convenient to grasp that does not interfere with the overall operation of the connector and be of any suitable shape or size.

Figure 5:
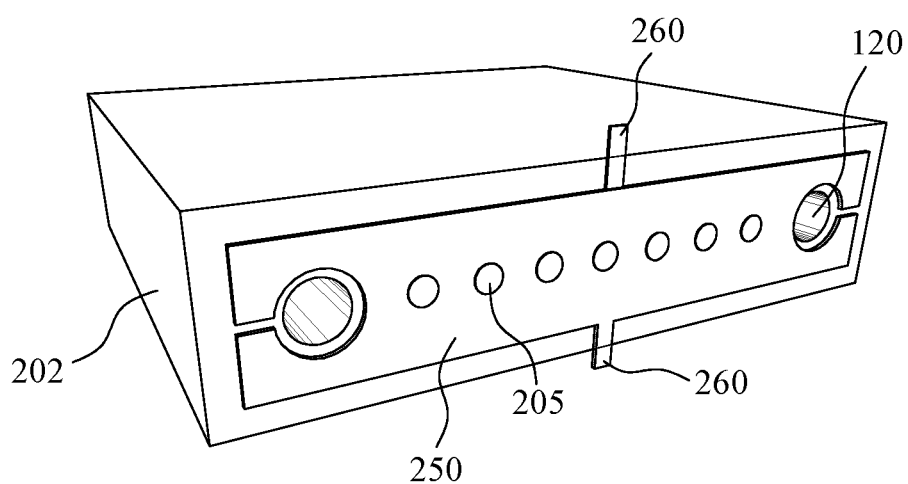
FIG. 5 shows an exemplary fiber protector with tabs mounted on a multi-fiber connector.

FIG. 5 shows a multi-fiber connector 202 with a mounted fiber protector with tabs 250, creating a protected connector 300. In this embodiment, the tabs 260 are on two sides of the fiber protector 250 and protrude above and below the fiber connector 202. It should be understood that while two tabs 260 are shown, less or more tabs 260 may be used, according to design preference.

Figure 6:
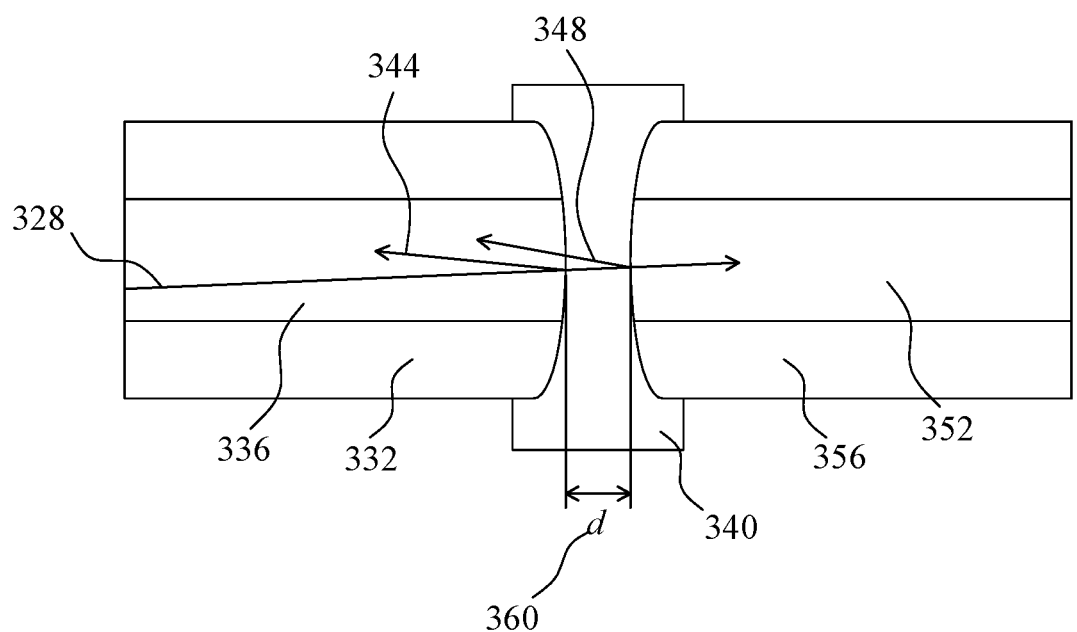
FIG. 6 shows an exemplary fiber optic coupling over a gap.

The transparent fiber protector 250 creates a small gap between fibers within a fiber connection. FIG. 6 shows is a closeup side illustration showing the detail of fiber coupling over this gap from a transmit fiber to a receive fiber. The transmit fiber is made up of a transmit fiber core 336, which contains the light, and a transmit fiber cladding 332. Similarly, the receive fiber has a receive fiber core 352 and receive fiber cladding 356. The material for both the core and the cladding is glass having a different reflective index for the two regions. The objective is to couple optical energy efficiently (typically >90%) from the transmit core to the receive core. The light path 328 within the transmit core 336 will experience a transmit reflection 344 at the end of the transmit fiber, and a receive reflection 348 at the start of the receive fiber. These are Fresnel reflections, caused by the difference in the index of refraction of materials. Only when the gap 360 is reduced to zero thickness (d=0) are the reflections nearly eliminated, since the fiber core materials have a nearly identical index of reflections (i.e., the difference in index would result from fiber manufacturing non-uniformity). If the gap 360 contained air, the magnitude of the Fresnel reflections would be approximately 4%, resulting in 0.36 dB of optical signal loss from the combined transmit reflection 344 and receive reflection 348. If the gap 360 is filled with a transparent film 340 that nearly matches the fiber core index of refraction, the Fresnel reflections can be substantially reduced. Therefore, in commercial embodiments, a suitable index of refraction for the film was set to 1.5, the typical index of the fiber core. However, any film with an index of refraction between 1.1 and 2.2 will produce less reflection than an air gap.

The film 340 can also create loss due to light scattering and absorption. However, in a commercial embodiment, the amount of scattering and absorption is negligible (<1%).

Figure 7:
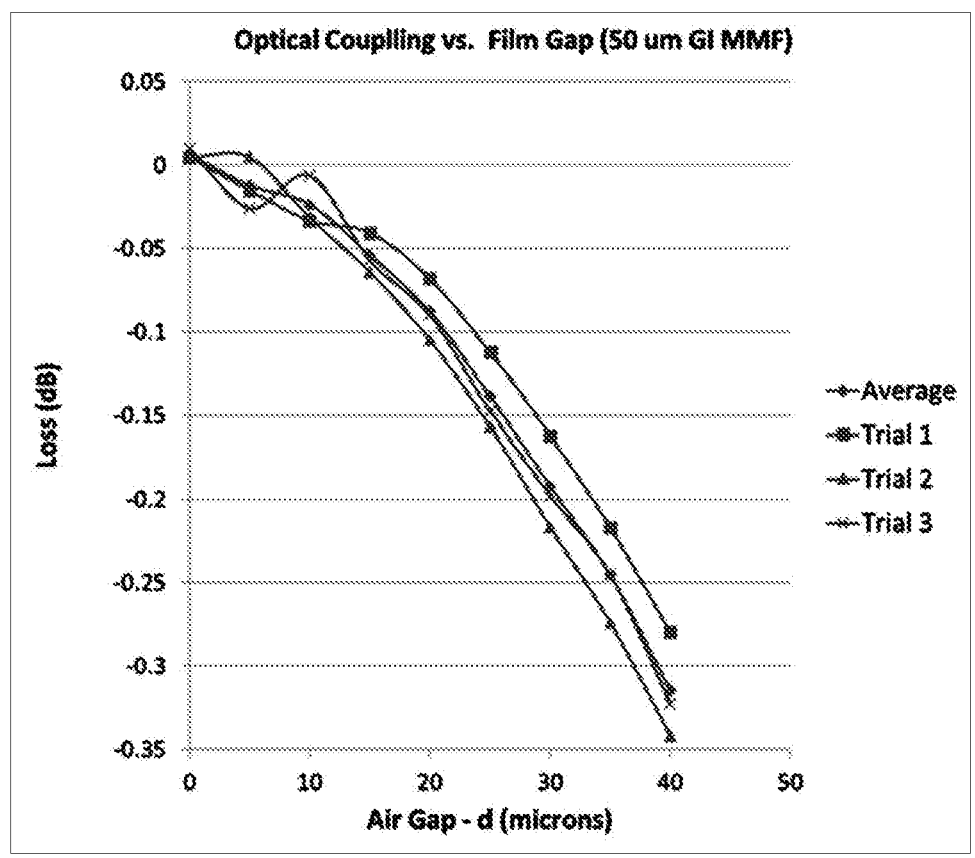
FIG. 7 shows a plot of an exemplary fiber optic coupling versus the width of the gap.

FIG. 7 is a plot showing measured results of fiber optic coupling between two fibers versus a film thickness. The type of fiber was a 50 micron graded index multi-mode fiber. The film was a polyethylene. The coupling was measured for gap 360 thickness d at steps of 5 microns with the gap filled with the film. A coherent laser source was used for this measurement, which shows up as some variations at gap thicknesses of d=5 microns and d=10 microns. If an application had an acceptable loss budget of −0.2 dB, a film thickness of roughly 25 microns would be expected to be acceptable with this film.

Figure 8:
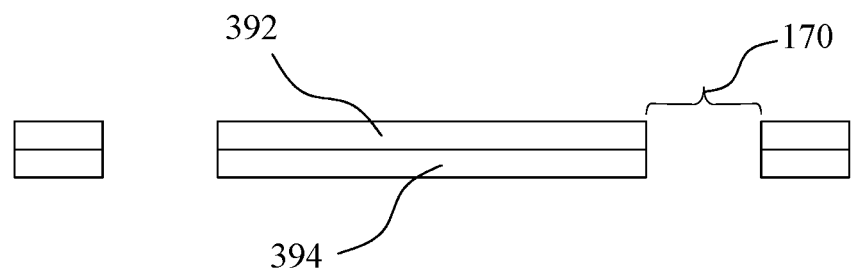
FIG. 8 shows an exemplary fiber protector with an adhesive layer.

A transparent adhesive layer added to the transparent film can aid securing the fiber protector in place on the connector. FIG. 8 is a cross-sectional illustration of an exemplary fiber protector 390 with a transparent adhesive layer 394 added. The adhesive layer 394 should be thin, for example, less than 25 microns. In the process of making the fiber protector 390, clearance 170 areas can be formed in the film 392. Silicone or acrylate adhesives are possible candidates for the transparent adhesive 394. Of course, other suitable adhesives may be used, according to design preference. The adhesive, in some embodiments, allows the fiber protector 390 to be removed without leaving residue on the fiber connector 202.

For outdoor environment applications, the film and adhesive should be chosen to survive in temperature extremes and in the presence of moisture.

The transparent film 392 can also be coated to improve the surface qualities for optical (i.e., anti-reflection or absorption coatings) and mechanical reasons. For example, the mechanical qualities can be improved with a diamond coating to provide resistance to scratches.

Figure 9:
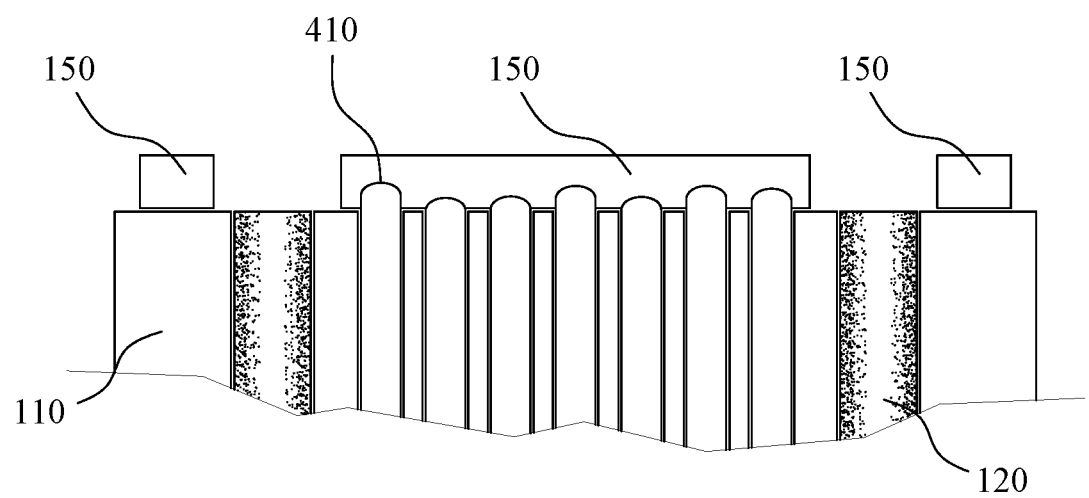
FIG. 9 shows a side view of an exemplary fiber protector on a multi-fiber connector.

FIG. 9 shows a top side, cut-away view 400 of a single fiber protector 150 on a multi-fiber connector 100. The multi-fiber connector 110 has alignment mechanisms 120, such as a guide hole or guide pin, and fiber ends 410 that protrude. Due to manufacturing variations, the fiber ends 410 may not protrude uniformly across an array of fibers. The fiber ends 410 are in contact with the fiber protector 150 is a manner that reduces the Fresnel reflections at this interface. The top surface of the fiber protector 150 can be substantially flat.

Figure 10:
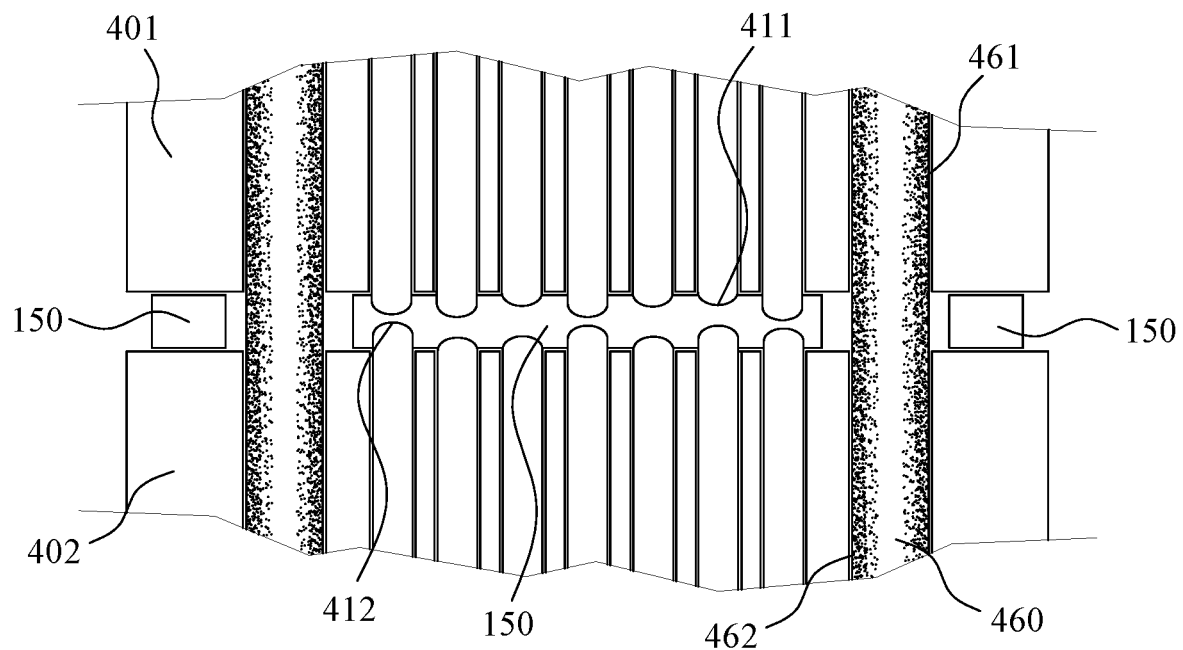

FIG. 10 shows a top side, cut-away view of a fiber connector 450 first side 401 mated to a fiber connector second side 402 so that one or more fibers are brought into alignment for the purpose of optical coupling. In this embodiment, a single fiber protector 150 is shown. An alignment hole first side 461 is aligned to alignment hole second side 462 with an alignment pin 460. This shows one method of achieving alignment, however other methods are possible. A fiber protector 150 is applied to fiber connector first side 401. The fiber ends first side 411 and fiber ends second side 412 are in physical contact with the fiber protector 150. Light is coupled from the fiber ends first side 411 to the fiber ends second side 412.

Figure 11:
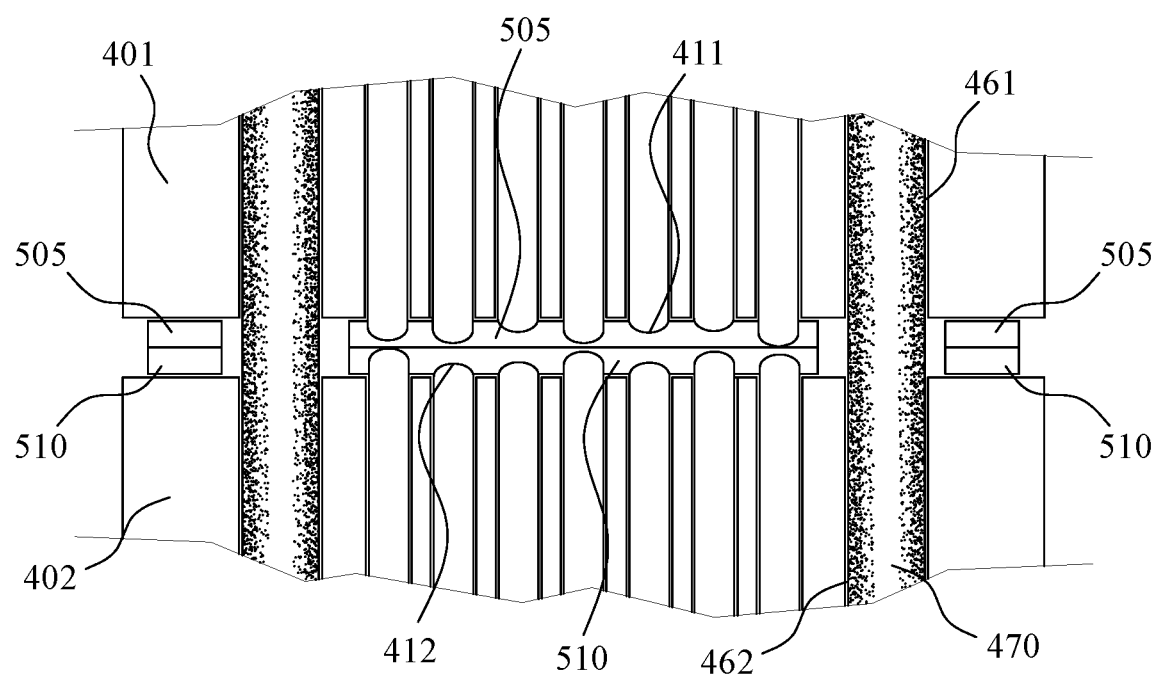

FIG. 11 shows a top side, cut-away view of a fiber connector 500 first side 401 mated to a fiber connector second side 402 so that one or more fibers are brought into alignment for the purpose of optical coupling. In this embodiment, two fiber protectors are utilized between the respective connector fibers. An alignment hole first side 461 is aligned to alignment hole second side 462 with an alignment pin 460. This shows one method of achieving alignment, however other methods are possible. A first fiber protector first side 505 is applied to fiber connector first side 401. The fiber ends first side 411 are in physical contact with the fiber protector first side 505. A fiber protector second side 510 is applied to fiber connector second side 402. The fiber ends first side 412 are in physical contact with the fiber protector second side 510. The fiber protector first side 505 is in physical contact with the fiber protector second side 510. Light is coupled from the fiber ends first side 411 to the fiber ends second side 412. Evident is the conforming of the fiber protector sides to the ends of the respective fibers, thus ensuring a non-air gap.

Figure 12:
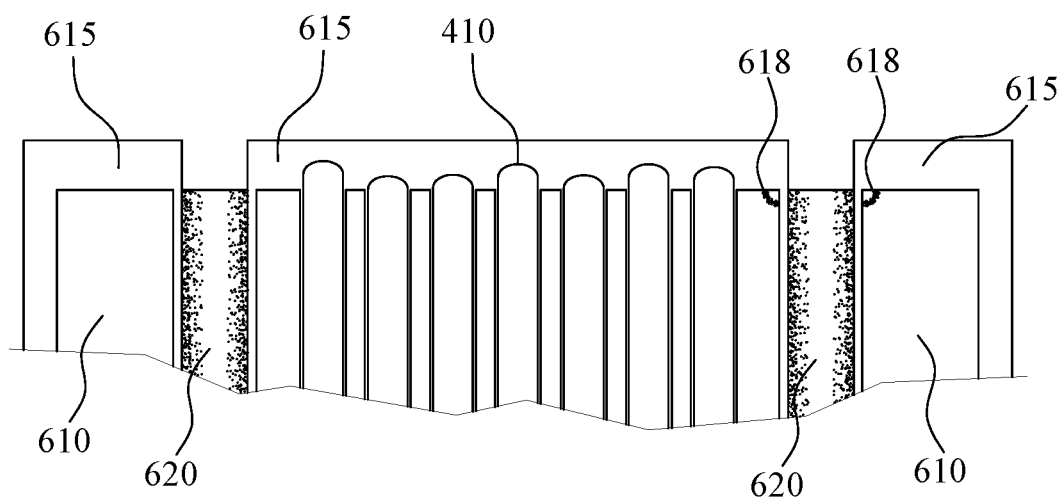
FIG. 12 shows an exemplary multi-fiber connector with a coating that protects the fiber.

FIG. 12 shows a top side, cut-away view of multi-fiber connector 600 with a coating that permanently protects the fiber. The fiber connector 610 has one or more fibers and may have an alignment mechanism, such as an alignment hole 620 or guide pin. The fiber ends 410 can be protruding from the fiber connector 610. A fiber protection coating 615 is applied permanently to the fiber connector 610. The fiber protection coating 615 covers the fiber ends 410. The fiber protection coating 615 may be applied with vapor deposited process, such as parylene or organic coatings. In commercial embodiments, a process that 1 micron precision of the coating thickness was used to provide consistent results. In one embodiment, the coating is applied to the entire fiber connector 610, including inside the alignment holes 610. In this embodiment, the inner diameter of the alignment hole 620 is reduced by the coating. To retain precision, the coating thickness inside the alignment hole 620 should be well controlled. A coating process with 1 micron thickness precision is adequate for most fiber-to-fiber alignment applications.

The process of mating guide pins into alignment holes 620 can cause damage 618 in the region around the alignment holes 620. Pieces of the fiber connector 610 can break away in these regions. The fiber protector coating 615 can reduce this damage 610 and also retain the pieces that would otherwise break away.

Figure 13:
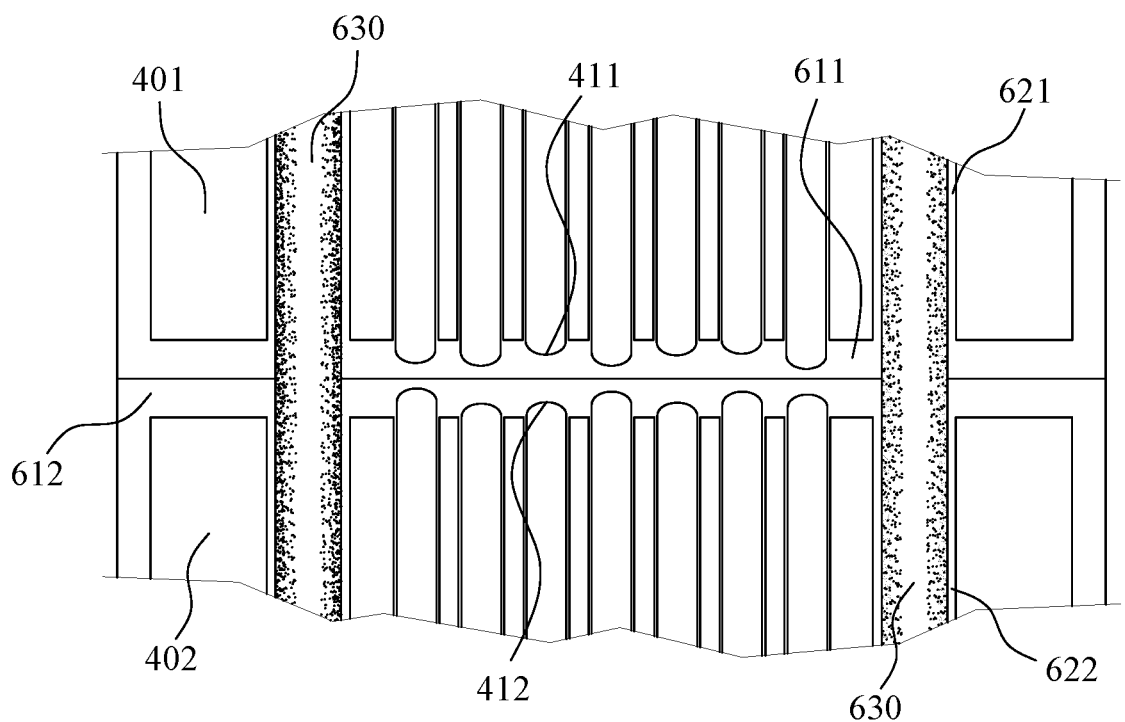
FIG. 13 shows two exemplary fiber connectors mated that have a coated fiber protector.

FIG. 13 shows a top side, cut-away view of two fiber connectors 650 mated that have a permanent coated fiber protector. The fiber connector first side 401 has a fiber protector coating first side 611 that is a permanent coating over the fiber ends first side 411. The fiber protector coating first side 611 may optionally coat the entire fiber connector first side 401, including the inside of the alignment hole first side 621. A fiber connector second side 402 has a permanent fiber coating second side 612 that protects the fiber ends second side 412. An alignment pin 630 can provide an alignment mechanism. The fiber ends first side 411 are aligned to fiber ends second side 412 so that light couples through the protector coating between the fibers. The fiber protector coating first side 611 is in physical contact with the fiber ends first side 411 and the fiber protector coating second side 612. The fiber ends second side 412 are in physical contact with the fiber protector coating second side 612.

The suitable index of refraction for the coating is 1.5, the typical index of the fiber core used in the industry. However, any coating with an index of refraction between 1.1 and 2.2 produced less reflection than an air gap. For outdoor environment applications, the coating should be chosen to survive in temperature extremes and in the presence of moisture.

Figure 14:
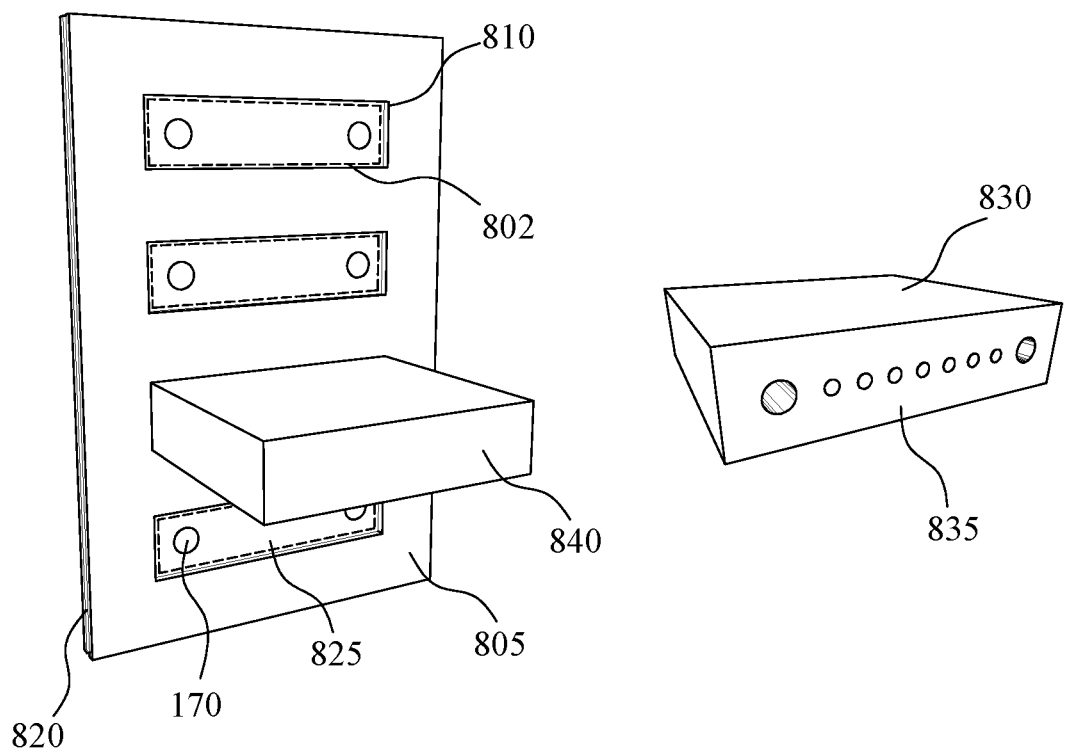
FIG. 14 shows an exemplary cartridge for applying film.

FIG. 14 is an illustration 800 of a method of applying the exemplary film with a cartridge. A mechanical support 805 provides the mechanism of holding the film 820 and alignment of the fiber connector(s) 830 to the film 820. The film 820 is applied to the mechanical support 805 and patterned to match the fiber connector face 835. This pattern can include clearance 170 for alignment mechanisms, pin slots (not shown), and a perforate pattern 802 to allow the fiber protector 150 to release from the film 820. The fiber connector 830 is pressed into the ferrule alignment mechanism 810 (which may be a hole in the support that matches the outer dimensions of the fiber connector 830). The adhesive side of the film 825 is mated to the fiber connector face 835, to create a fiber connector aligned that is face mated 840 into film 820. The cartridge can be a standalone element, or it can be contained into a higher level tool that provides indexing of the cartridge.

Figure 15:
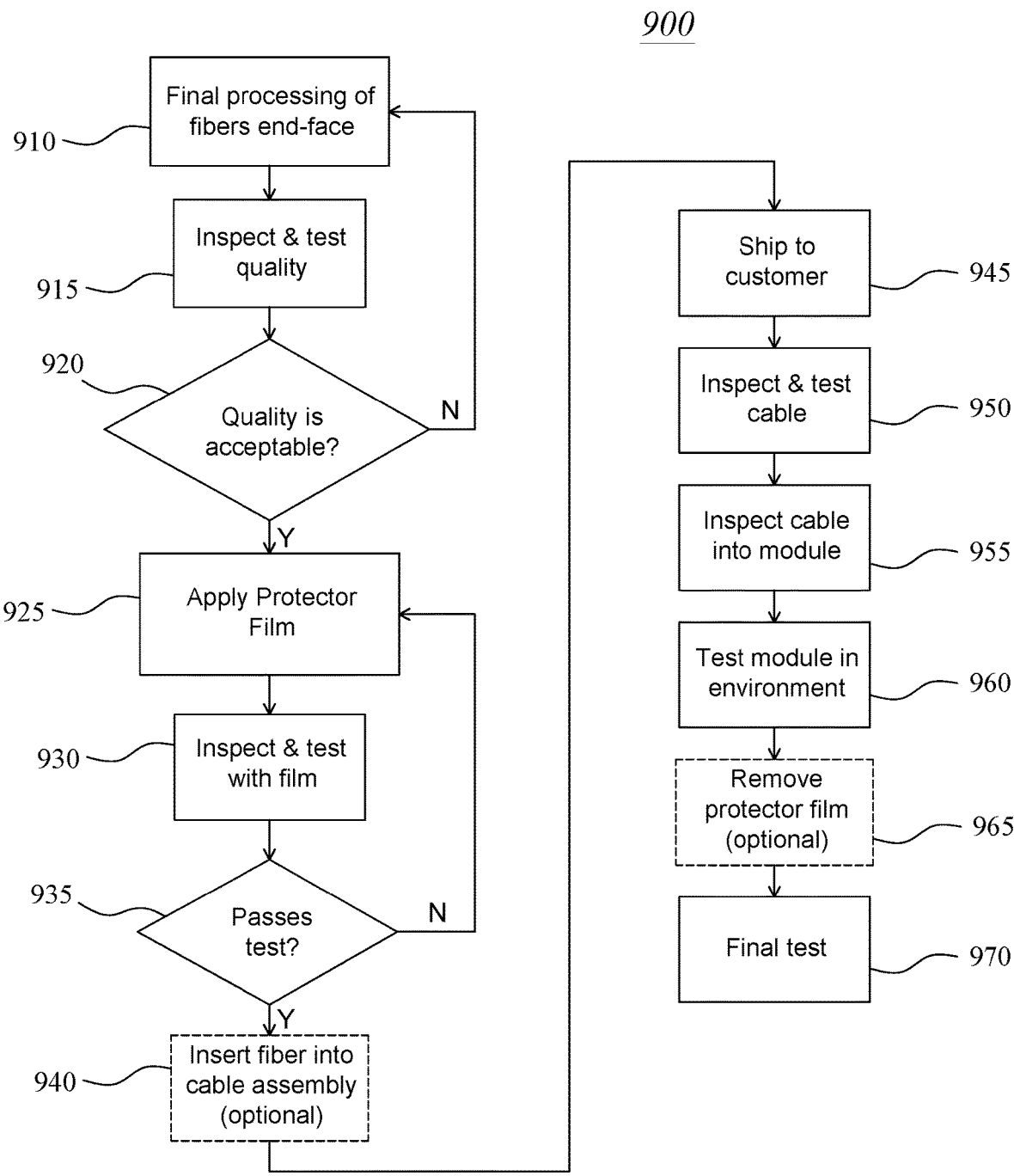
FIG. 15 shows an exemplary process using a film-based fiber protector.

FIG. 15 is a process flow 900 illustrating an example of film protection. First, the ferrule has final processing the fiber end-face 910. At this point the fiber ends are in their final state, such as polished or cleaved. These fibers are then inspected and tested for quality 915 (for example, optical inspection with an interferometer and optical coupling tests). If the quality is not acceptable 920, the ferrule may be re-processed. If acceptable 920, the film is applied 925. Then the ferrule is inspected and tested 930. If the ferrule does not pass the test 935, the film is re-applied 925. If the ferrule passes the test 935, it is optionally assembled into a higher level cable 940. The cable is shipped to a customer 945. The customer can inspect and test the cable 950, insert the cable in a module 955 and test the module in environmental conditions 960. After testing the film can be optionally removed 965 or left in place for final test 970 and system integration.

Figure 16:
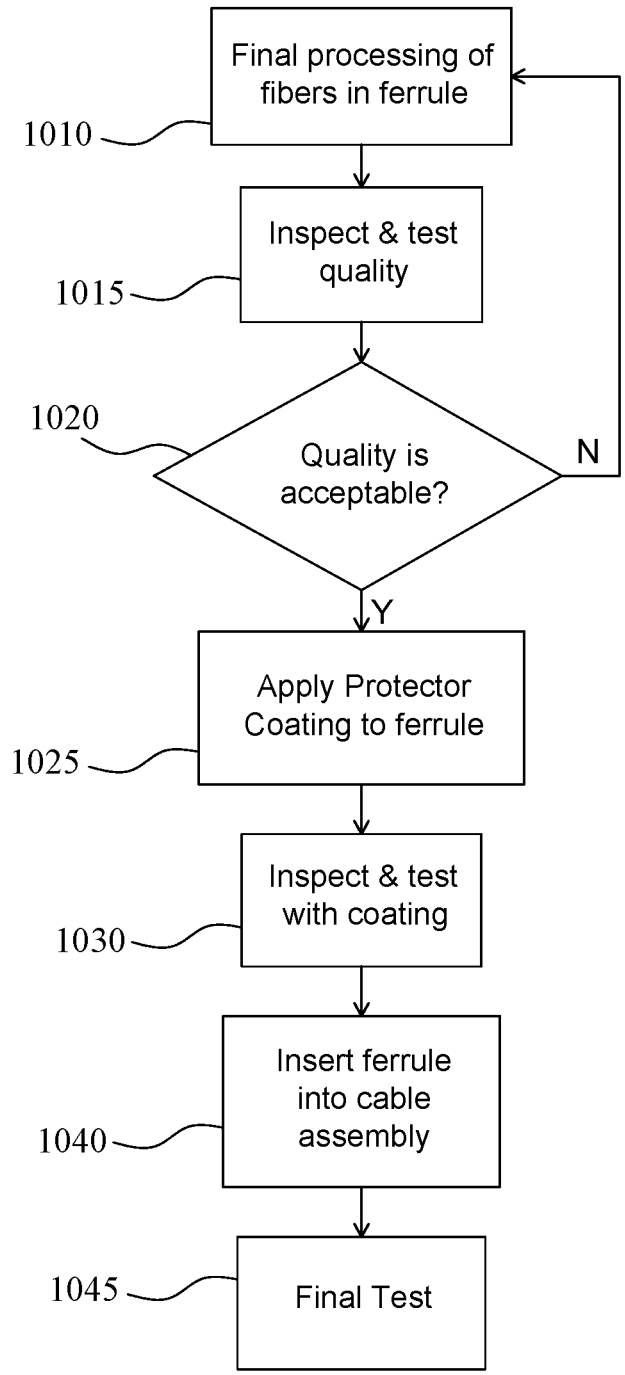
FIG. 16 shows an exemplary manufacturing flow for permanent coating.

FIG. 16 shows a manufacturing flow 1000 for a cable created with the coating. The fibers are processed into the ferrule 1010. This step includes inserting the fibers into the ferrule, and processing the fiber ends (polishing or cleaving). The next step is to inspect and test quality 1015 of the fiber connector. If the quality is not acceptable 1020, the ferrule is re-processed. If the quality is acceptable 1020, the next step is to apply the protector coating to the ferrule 1025, then inspect and test with the coating (1030). The ferrule may be then assembled into a higher-level cable assembly 1040 and then final test 1045.

In view of the above, it should be appreciated by one skilled in the art that the functional blocks, methods, devices and systems described in the present disclosure may be integrated or divided into different combinations of systems, devices, and functional blocks, as would be known to those skilled in the art.

For example, while the process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An exposed optical fiber end protection device for facilitating high optical coupling efficiency between pairs of a plurality of optical fiber ends to be joined via mating of their respective mechanical optical couplers, comprising:
a removable planar transparent tape of uniform thickness having a pre-sized shape to fit over a prospective multi-fiber ferrule face; and
pre-formed alignment openings disposed in the tape, positioned to align the tape to the prospective multi-fiber ferrule face and allow passage of prospective ferrule securing mechanisms through the alignment openings,
wherein, when applied to the prospective multi-fiber ferrule face, the tape flexibly conforms around exposed optical fiber ends in the ferrule face to prevent contamination of the exposed optical fiber ends and reduce Fresnel reflections, and
wherein the pre-sized shape of the removable planar transparent tape comprises a matching shape that substantially matches the prospective multi-fiber ferrule face and tabs that extend from a boundary of the matching shape.

2. The protection device of claim 1, wherein a perimeter of the pre-sized shape of the tape is defined by a perforate pattern, enabling the tape to be removable from a sheet of tape material.

3. The protection device of claim 1, wherein the tape has an index of refraction between approximately 1.1-2.2, and a Rockwell scale E hardness of between approximately 30-150.

4. The protection device of claim 1, wherein the tape is formed from a polyimide, polyethylene, polyurethane, or silicone.

5. The protection device of claim 1,
wherein the tabs and the matching shape are contained in a same plane of the removable planar transparent tape, and
wherein the tabs are configured for use as gripping tabs.

6. The protection device of claim 5, wherein the gripping tabs comprise two gripping tabs arranged at opposing edges of the tape.

7. The protection device of claim 1, wherein an index of refraction of the tape is approximately 1.5.

8. The protection device of claim 1, further comprising:
a transparent adhesive layer disposed on a ferrule-facing side of the tape, wherein the adhesive layer is configured to leave no residues on the multi-fiber ferrule face after removal of the tape; and
a discardable protective sheet over the adhesive layer, allowing the protective sheet to be removed from the tape and the tape adhesively applied to a ferrule's face.

9. The protection device of claim 8,
wherein a thickness of the tape is approximately between 50-25 microns, and
wherein a thickness of the transparent adhesive layer is less than 25 microns.

10. The protection device of claim 1, wherein the tape has:
a Rockwell scale E hardness of approximately between 50-100,
an index of refraction between approximately 1.1-2, and
a thickness of less than 25 microns.

11. The protection device of claim 1, further comprising:
a transparent adhesive layer disposed on a ferrule-facing side of the tape, wherein the adhesive layer is configured to leave no residues on the multi-fiber ferrule face after removal of the tape;
a discardable protective sheet over the adhesive layer, allowing the protective sheet to be removed from the tape;
at least one pattern on the tape, the pattern matching a face of one or more mechanical optical coupler's ferrules; and
a tape holding, flat cartridge containing the tape, for application to the face of the one or more mechanical optical coupler's ferrules.

12. An exposed optical fiber end protection device for facilitating high optical coupling efficiency between pairs of a plurality of optical fiber ends to be joined via mating of their respective mechanical optical couplers, comprising:
a removable planar transparent tape of uniform thickness, having a pre-sized shape to fit over prospective first and second multi-fiber ferrule faces; and
pre-formed alignment openings disposed in the tape, positioned and sized to align the tape to the prospective first and second multi-fiber ferrule faces and allow passage of prospective ferrule securing mechanisms through the alignment openings,
wherein, when applied to one of the prospective first and second multi-fiber ferrule faces, and the prospective first and second multi-fiber ferrule faces are joined, the tape flexibly conforms around exposed optical fiber ends in the ferrule faces to prevent contamination of the exposed optical fiber ends and reduce Fresnel reflections, and wherein the pre-sized shape of the removable planar transparent tape comprises a matching shape that substantially matches the prospective multi-fiber ferrule face and tabs that extend from a boundary of the matching shape.

13. The protection device of claim of claim 12, further comprising a transparent adhesive layer having a thickness of less than 25 microns disposed on at least one side of the tape, the adhesive securing the tape to one of the first or second multi-fiber ferrule faces and configured to leave no residues on said ferrule faces when the tape is removed.

14. The protection device of claim 12, wherein the tape has a Rockwell scale E hardness of approximately between 50-100 and an index of refraction between approximately 1.1-2.

15. An optical fiber connector comprising:
a multi-fiber ferrule comprising an end-face; and
the protection device according to claim 1 applied on the end-face.

16. A method of facilitating high optical coupling efficiency for a mechanical optical coupler with another mechanical optical coupler, comprising:
forming a planar transparent tape of uniform thickness that is pre-sized to fit over a multi-fiber ferrule face;
forming pre-formed alignment openings in the tape, positioned to align the tape to the multi-fiber ferrule face and allow passage of ferrule securing mechanisms through the alignment openings;
forming a perforate pattern on a perimeter of the tape;
housing the tape in a dispensing cartridge, wherein the cartridge has one or more exposed faces with the tape therein;
aligning the multi-fiber ferrule face to an exposed face of the cartridge to press the tape to the ferrule's face to cause its adherence to the ferrule's face; and
retracting the multi-fiber ferrule with adhered tape from the cartridge,
wherein the perforate pattern comprises a matching shape that substantially matches the multi-fiber ferrule face and tabs that extend from a boundary of the matching shape.

17. The method of claim 16, further comprising coupling, via the ferrule securing mechanisms, the taped ferrule face to another multi-fiber ferrule.

18. The method of claim 16, wherein the tape comprises a transparent adhesive layer having a thickness of less than 25 microns, the adhesive layer aiding in the tape's adherence to the ferrule's face and configured to leave no residues on the ferrule's face when the tape is removed.

19. The method of claim 18, further comprising:
forming a protective removable film over the adhesive layer; and
removing the protective film prior to aligning the multi-fiber ferrule face.

* * * * *